(12) United States Patent
van Lammeren et al.

(10) Patent No.: US 9,673,657 B2
(45) Date of Patent: *Jun. 6, 2017

(54) BATTERY CHARGING APPARATUS AND APPROACH

(71) Applicant: NXP B.V., Eindhoven (NL)

(72) Inventors: Johannes Petrus Maria van Lammeren, Beuningen (NL); Henricus Cornelis Johannes Büthker, Eindhoven (NL); Luc Raijmakers, Afferden (NL)

(73) Assignee: NXP B.V., Eindhoven (NL)

( * ) Notice: Subject to any disclaimer, the term of this patent is extended or adjusted under 35 U.S.C. 154(b) by 413 days.

This patent is subject to a terminal disclaimer.

(21) Appl. No.: 14/244,610

(22) Filed: Apr. 3, 2014

(65) Prior Publication Data

US 2015/0288213 A1    Oct. 8, 2015

(51) Int. Cl.
  *H02J 7/04*      (2006.01)
  *H02J 7/16*      (2006.01)
  *H02J 7/00*      (2006.01)

(52) U.S. Cl.
  CPC ......... *H02J 7/0091* (2013.01); *H02J 7/0077* (2013.01)

(58) Field of Classification Search
  CPC ............ G01R 31/3662; G01R 31/3606; G01R 31/3651; G01R 31/3658; G01R 27/02; G01R 31/3679; G01R 31/3689; H01M 10/486; H01M 10/443; H01M 10/617; H01M 2/34; H01M 2/348; H02J 7/0091
  See application file for complete search history.

(56) References Cited

U.S. PATENT DOCUMENTS

| 7,443,139 | B2 | 10/2008 | Mitsui et al. |
| 9,322,884 | B2 * | 4/2016 | Luo ..................... G01R 31/3662 |
| 2012/0105070 | A1 | 5/2012 | Van Lammeren et al. |
| 2012/0155507 | A1 * | 6/2012 | Srinivasan .............. H01M 2/34 374/45 |
| 2012/0280693 | A1 | 11/2012 | Lammers |

(Continued)

FOREIGN PATENT DOCUMENTS

| JP | 2008298786 A | 12/2008 |
| JP | 2010243481 A | 10/2010 |

(Continued)

OTHER PUBLICATIONS

Young-Jin Hong and Chi-Su Kim, "Modeling of the thermal behaviour of a Lithium-Ion battery pack," Advanced Automotive Battery conference 2010.

(Continued)

*Primary Examiner* — Nha Nguyen

(57) ABSTRACT

Various methods, apparatuses and systems are directed to battery-charging applications. As may be consistent with one or more embodiments discussed herein, a charging current for charging a battery is modulated, and the frequency of the modulated charging current is set based upon an impedance of the battery. Temperature of the battery is estimated based upon the impedance exhibited by the battery, while the battery is charged with the modulated charging current. In various implementations, the battery charging rate is controlled based on the estimated temperature.

16 Claims, 6 Drawing Sheets

(56) References Cited

U.S. PATENT DOCUMENTS

| | | | |
|---|---|---|---|
| 2012/0303208 A1* | 11/2012 | Hariharan | H01M 10/48 701/32.9 |
| 2012/0310562 A1 | 12/2012 | Van Lammeren et al. | |
| 2013/0307487 A1* | 11/2013 | Matthe | H01M 10/486 320/152 |
| 2013/0314049 A1 | 11/2013 | Van Lammeren et al. | |
| 2015/0104673 A1 | 4/2015 | De Greef et al. | |

FOREIGN PATENT DOCUMENTS

| | | |
|---|---|---|
| WO | 2011004249 A2 | 1/2011 |
| WO | 2011122946 A2 | 10/2011 |
| WO | 2013018641 A1 | 2/2013 |

OTHER PUBLICATIONS

P.H.L. Notten, J.H.G. op het Veld, J.R.G. van Beek, "Boostcharging Li-ion batteries: A challenging new charging concept," Journal of Power Sources (2005).

L.H.J. Raijmakers, D.L.Danilov, J.P.M. van Lammeren, M.J.G. Lammers, P.H.L. Notten, "Sensorless battery temperature measurements based on electrochemical impedance spectroscopy," Journal of Power Sources (2013).

Jan Philipp Schmidt, et al. "Measurement of the internal cell temperature via impedance: Evaluation and application of a new method," Journal of Power Sources, 243, pp. 110-117, (2013).

Rengaswamy Srimivasan et al., "Instantaneous measurement of the internal temperature in lithium-ion rechargeable cells," Electrchimica Acta, 56, pp. 6198-6204, (2011).

Rako P. "Battery-Stack_Monitor ICs Scrutinize the Cells", 7 pgs. (Jan. 20, 2011), retrieved from the Internet at http://www.edn.com/electronics-products/other/4363937/Battery-stack-monitor-ICs-scrutinize-the-cells., downloaded Apr. 5, 2017.

Texas Instruments, bq78PL116 "PowerLAN $^{Tm}$ Master Gateway Battery Management Controller With PowerPump Tm Cell Balancing Technology," Oct. 2010—Revised Feb. 2011.

* cited by examiner

BATTERY CHARGING APPARATUS AND APPROACH

Aspects of various embodiments are directed to methods and apparatuses for charging batteries and the control thereof.

The demand for devices that use rechargeable batteries has increased tremendously, as has consumer demand for increased functionality in such devices. Such high functionality often requires high processing power, which can place demands on battery operation. Further, such power consumption can place greater demands upon the recharging of batteries. In addition, users often desire fast charging rates so that devices can be charged in a shorter time period.

The properties and behavior of a battery cell strongly depend on its temperature. At very high or low temperatures, current drive and charge acceptance capabilities may be reduced. If the load and charger of a battery cell do not take this effect into account, the lifetime of the cell may be severely reduced. However, determining the temperature of a battery can be challenging. For instance, temperature can vary throughout a battery, and the thermal mass of a battery cell may make temperature changes inside the battery cell difficult to detect from an outside or outer portion of the battery cell. As battery properties and ageing effects are temperature-dependent, the temperature of each cell is desirably known to within 1K. Obtaining this measurement accuracy is challenging if not sensed inside the chemically active part of the cell. In addition, measuring temperature becomes more complex in large battery packs with many series-connected cells, such as for those used in electric vehicles. Generally, the weakest cell determines the pack's capacity and current drive capabilities. However, at different temperatures, different cells may be the weakest. While thermal models can be used to identify individual cell temperatures, such a model can be difficult to implement. In addition, while different sensors can be used for each battery cell, such an approach can be cost-prohibitive and otherwise challenging to implement. Further, rapid charging and difficulties in measuring temperature can introduce overheating problems, and related repercussions.

These and other matters have presented challenges to battery charging methods, apparatuses and their implementation, for a variety of applications.

Various example embodiments are directed to battery charging methods, apparatuses, and their implementation.

According to an example embodiment, an apparatus includes a first circuit that modulates charging current for charging a battery, and that sets the frequency of the modulated charging current based upon an impedance of the battery. A second circuit estimates temperature of the battery based upon the impedance exhibited by the battery while the battery is charged with the modulated charging current.

In a more particular embodiment, an apparatus includes a current modulation circuit that modulates charging current provided by a charging source, and that provides the modulated charging current as an output for charging a battery. An impedance detection circuit operates with the current modulation circuit to detect an impedance of the battery based on the frequency of the modulated current, and modifies the frequency of the modulated charging current based on the detected impedance. A temperature estimation circuit estimates temperature of the battery based upon the detected impedance, and a current regulator circuit regulates the charging current provided as the output based upon the estimated temperature.

Another embodiment is directed to a method as follows. Charging current is modulated for charging a battery, and the frequency of the modulated charging current is set based upon an impedance of the battery. The temperature of the battery is estimated based upon the impedance exhibited by the battery while the battery is charged with the modulated charging current. In some implementations, the charging current is regulated by reducing the charging current in response to the estimated temperature exceeding a predefined threshold. Modulating the charging current may include, for example, setting a frequency of the charging current to a frequency indicative of a zero crossing point of an imaginary part of an impedance curve for the battery, or to an intercept point of an impedance curve for the battery. Temperature of the battery can then be estimated using the zero crossing and/or linear interpolation with the frequency indicative of the intercept point.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
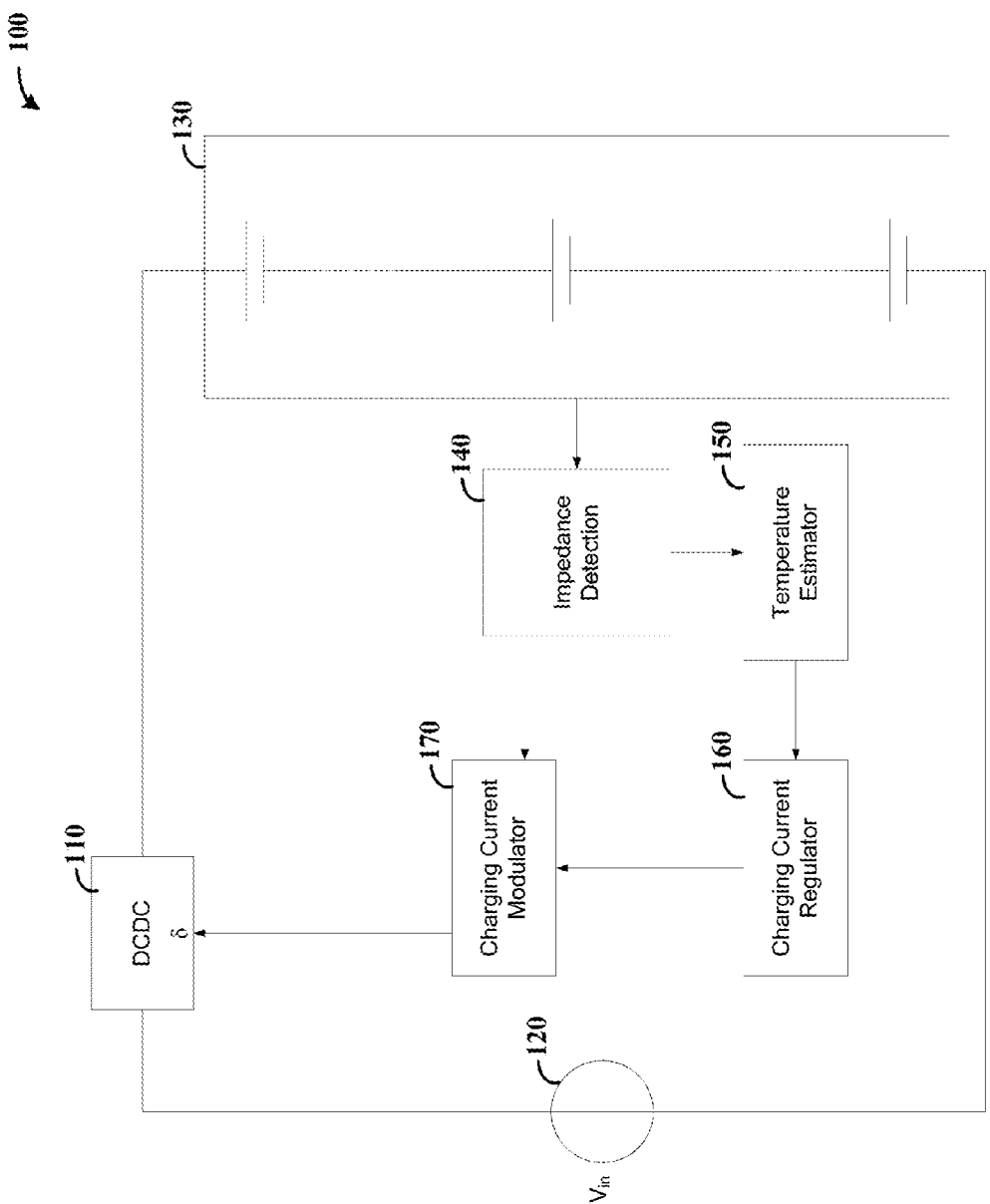
FIG. 1 shows a block diagram of a battery charging apparatus, in accordance with an example embodiment.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of apparatuses, systems and methods involving battery charging. While not necessarily so limited, various aspects may be appreciated through a discussion of examples using this context.

Various example embodiments are directed to controlling the charging of a battery based on estimation of temperature within the battery. The temperature estimation is carried out based upon an impedance of the battery while the battery is charged with current modulated at one or more particular frequencies. Such an approach may, for example, involve estimating temperature using a frequency of the charging current that facilitates detection of an intercept point for a plot of impedance exhibited by the battery while it is charged. Such an intercept may, for example, involve a high frequency intercept, or a zero crossing intercept. Various methods and apparatuses may implement such approaches.

In another example embodiment, an apparatus includes a first (charging) circuit that modulates charging current provided to a battery, using a frequency that is set based upon an impedance of the battery. In some implementations, the frequency is set such that detected impedance exhibits an intercept at a particular frequency, which can facilitate accurate temperature measurement. In this context, the frequency at which the charging current is modulated can be modified based upon detected impedance, to achieve the desired frequency corresponding to the intercept. A second (temperature estimation) circuit estimates temperature of the battery based upon the impedance exhibited by the battery, while the battery is charged with the modulated charging current. In certain implementations, the apparatus further uses the estimated temperature to regulate the charging current, such as by reducing the charging current in response to the estimated temperature exceeding a predefined threshold. In a more particular embodiment, a third (impedance detection) circuit detects impedance of the battery and operates with the first charging circuit to modify the frequency of the modulated charging current based on a phase difference of the voltage and current through the battery.

Figure 5:
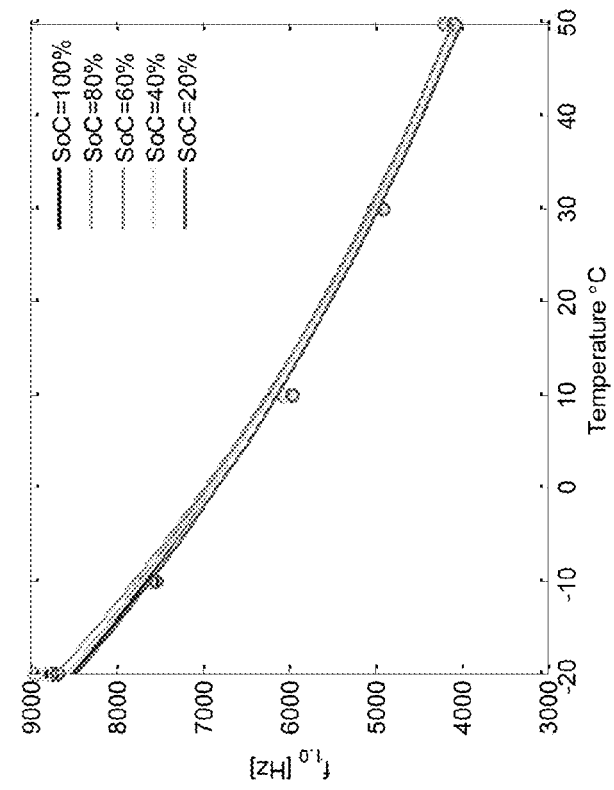
FIG. 5 shows a plot of non-zero intercept frequency of $f_{(1.0)}$, as used in estimating temperature in accordance with one or more embodiments.
Figure 4:
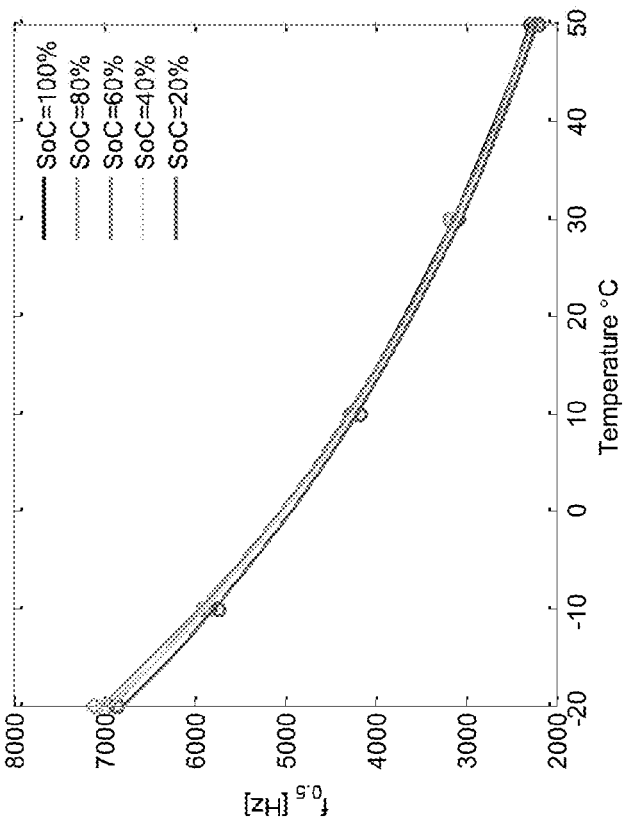
FIG. 4 shows a plot of non-zero intercept frequency of $f_{(0.5)}$, as used in estimating temperature in accordance with one or more embodiments.
Figure 7:
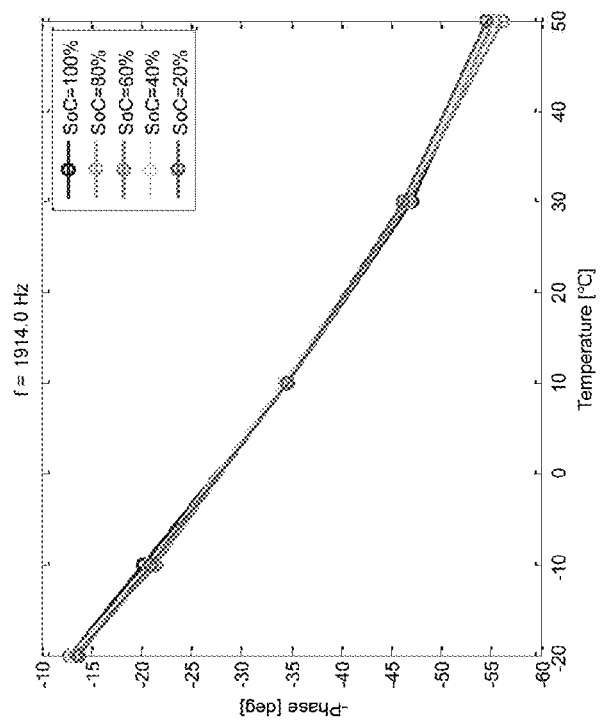
FIG. 7 shows a plot of phase shift at a frequency of 1914 Hz, as used in estimating temperature in accordance with one or more embodiments.
Figure 6:
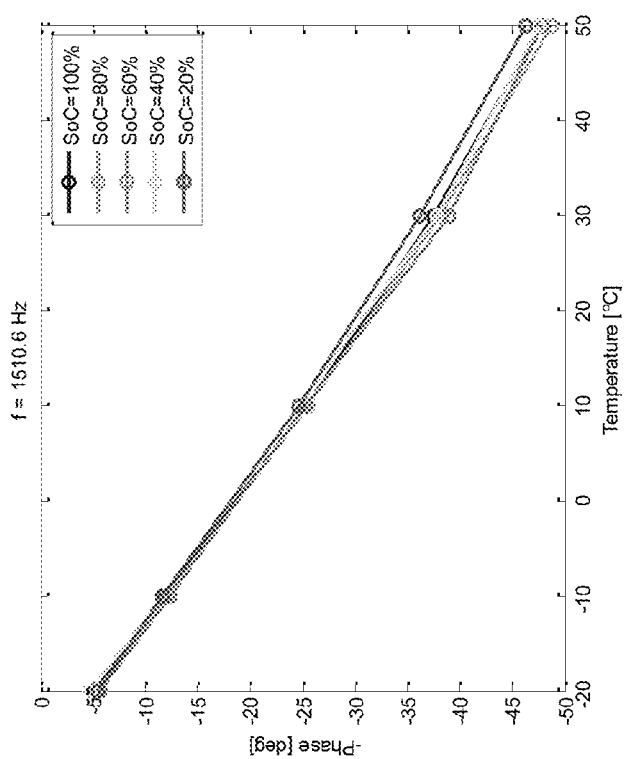
FIG. 6 shows a plot of phase shift at a frequency of 1510 Hz, as used in estimating temperature in accordance with one or more embodiments.
Figure 9:
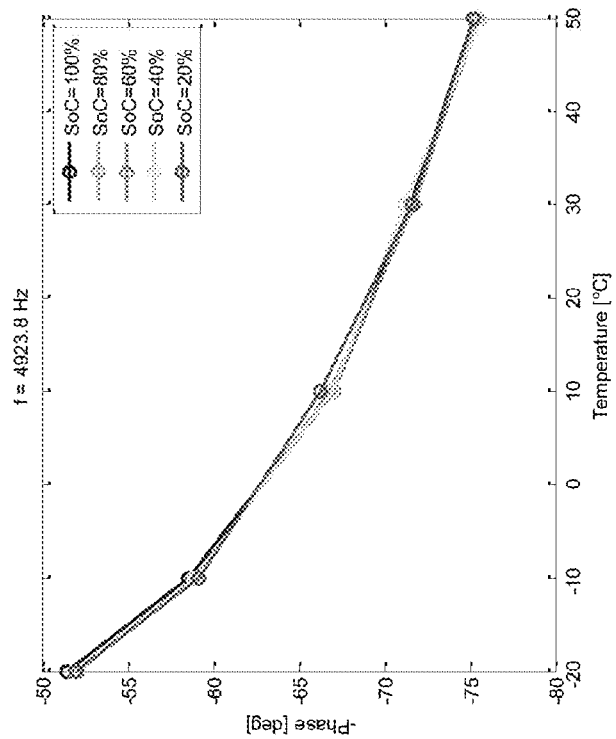
FIG. 9 shows a plot of phase shift at a frequency of 4923 Hz, as used in estimating temperature in accordance with one or more embodiments.
Figure 8:
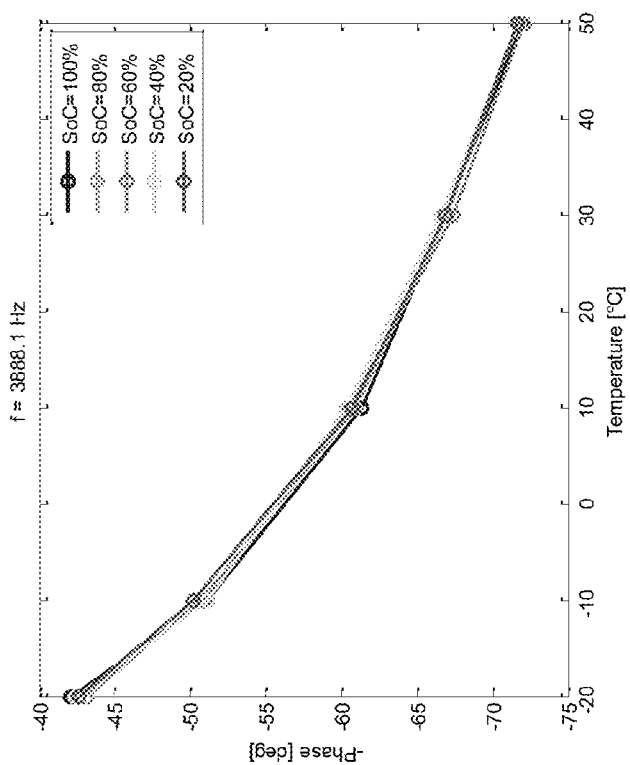
FIG. 8 shows a plot of phase shift at a frequency of 3888 Hz, as used in estimating temperature in accordance with one or more embodiments.

The charging current is modulated in one or more of a variety of manners. In some embodiments, the charging current is modulated at a frequency at which an imaginary part of the impedance is zero, at which a voltage across and current through the battery are in phase, or that is indicative of a zero crossing point of an imaginary part of an impedance curve for the battery. In other embodiments, the charging current is set to a frequency at which an imaginary part of the impedance is positive and at which the frequency is indicative of a non-zero intercept frequency of the imaginary part of the impedance curve (e.g., with the non-zero intercept being used as an indication of temperature). Accordingly, such a non-zero intercept point may be determined as a frequency at which a Nyquist plot for the battery crosses a line parallel to the real axis, with an imaginary part unequal to zero (e.g., 0.5 mΩ or 1.0 mΩ, such as shown in FIGS. 4 and 5). In another embodiment, the charging current is modulated at a frequency at which an imaginary part of the impedance is positive, with the battery temperature being based upon a phase between current and voltage exhibited by the battery while the battery is charged with the modulated charging current. In another embodiment, the frequency of the charging current is modified while monitoring the impedance of the battery, and set to a frequency at which the monitored impedance is indicative of an intercept point of an impedance curve for the battery. In a more particular embodiment in which the charging current is modulated at a frequency indicative of an intercept point of an impedance curve for the battery, temperature of the battery is estimated based upon the impedance exhibited by the battery while the battery is charged with the modulated charging current, by estimating temperature using linear interpolation.

Another embodiment is directed to an apparatus as follows, and which may be implemented using one or more approaches as described above. A current modulation circuit modulates charging current provided by a charging source, and provides the modulated charging current as an output for charging a battery. An impedance detection circuit operates with the current modulation circuit to detect an impedance of the battery based on the frequency of the modulated current, and modifies the frequency of the modulated charging current based on the detected impedance. A temperature estimation circuit estimates temperature of the battery based upon the detected impedance, and a current regulator circuit regulates the charging current provided as the output based upon the estimated temperature.

The frequency of the modulated charging current is set using one or more of a variety of approaches. In some implementations, the frequency is set based on one or more of: a phase difference of the voltage and current through the battery, a frequency at which an imaginary part of the battery impedance is zero, a frequency at which a voltage across and current through the battery are in phase, a frequency of the charging current to a frequency indicative of a zero crossing point of an imaginary part of an impedance curve for the battery, and a frequency at which the detected impedance is indicative of an intercept point of an impedance curve for the battery.

In a more particular embodiment, the current modulation circuit modulates the charging current by setting a frequency of the charging current to a frequency indicative of an intercept point of an impedance curve for the battery, based upon the impedance detected by the impedance detection circuit. The temperature estimation circuit estimates temperature of the battery based upon the impedance exhibited by the battery while the battery is charged with the modulated charging current, by estimating temperature using linear interpolation with the frequency indicative of the intercept point.

FIG. 1 shows the block diagram of a battery charging apparatus 100, in accordance with another example embodiment. The battery charging apparatus 100 includes a DCDC converter 110 that converts an input DC voltage from a source 120 into a DC current to charge a battery 130. An impedance detection circuit 140 detects impedance characteristics of the battery 130, and a temperature estimation circuit 150 estimates the temperature of the battery 130 based on the detected impedance. A charging current regulator circuit 160 regulates current based on the estimated temperature (e.g., to prevent overheating), and a charging current modulator 170 modulates the frequency of the charging current to facilitate the impedance detection. In some embodiments, the charging current modulator 170 modulates the frequency of the charging current to provide a frequency that corresponds to a zero crossing point of an imaginary part of an impedance curve as detected by the impedance detection circuit 140. This approach further facilitates accurate temperature measurement.

In some embodiments, the charging current regulator 160 varies the charging current according to the type of charging (e.g., slow or fast), and/or the state of charge of the battery. When the cell(s) in the battery reach a certain chemistry-dependent voltage (e.g., 4.3V), the voltage is kept constant and the current is slowly reduced as the cells approach the full-charge state. This approach can be combined with temperature estimation and related current control as discussed above. In some implementations, the output current of the DCDC converter 110 is measured by an ammeter such as a resistor or a Hall device. The output of the ammeter is compared to a reference to control the duty cycle of the DCDC converter, with the reference being a signal to keep the current constant ($I_{charge}$). Once the battery voltage reaches its maximum level, it will be kept constant by a control loop that has signal $V_{max}$ as its input. A minimum detector passes the correct signal to obtain a desired charging characteristic.

Various approaches are used for estimating temperature based on impedance, to control the charging of a battery. In some embodiments, a Nyquist plot of the battery is used for estimating the battery's impedance as a function of the frequency. In many implementations, the intercept frequency (the frequency at which the Nyquist plot intercepts the real axis) is used as an indicator of the battery temperature.

Figure 2:
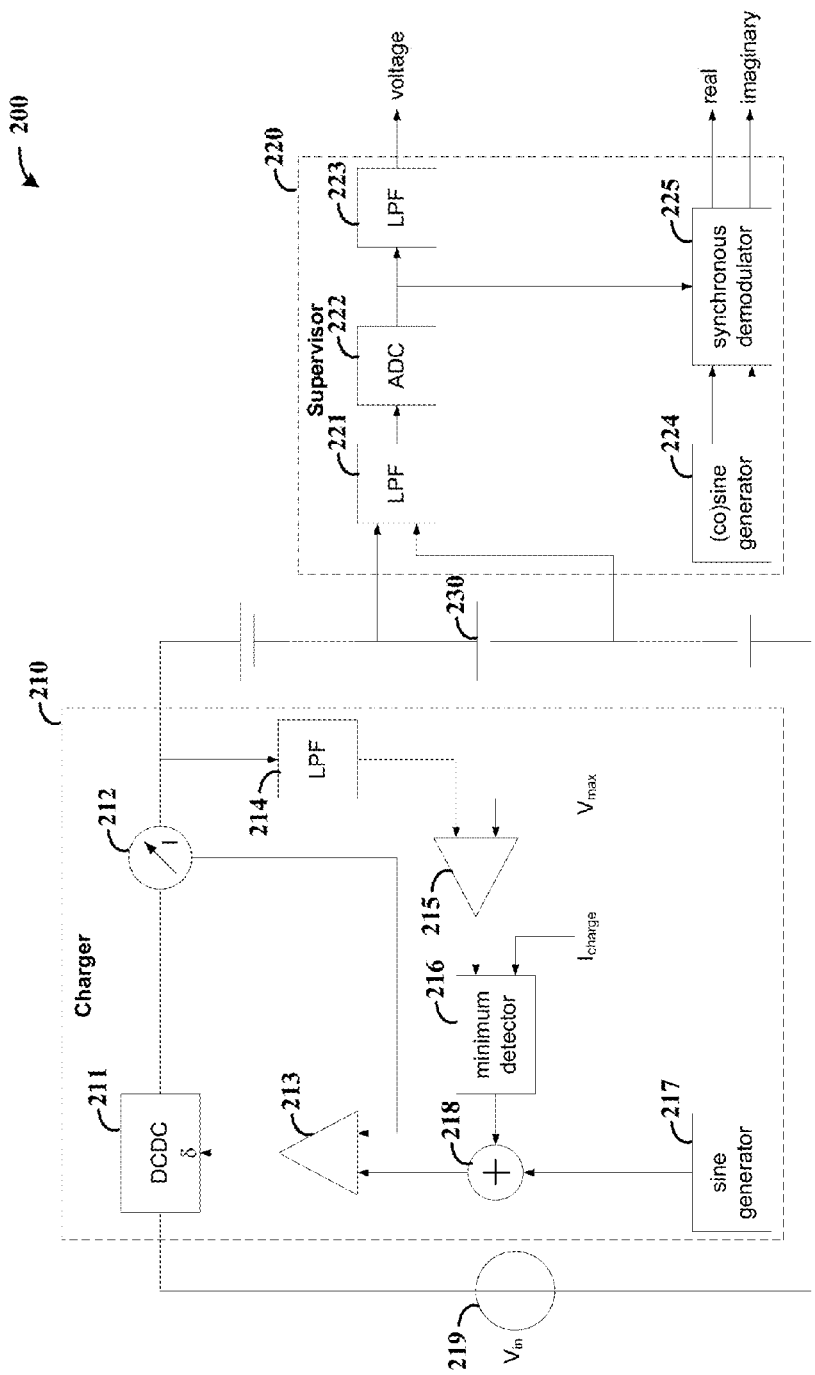
FIG. 2 shows a battery management apparatus, in accordance with a more particular embodiment.

FIG. 2 shows a battery management apparatus 200, in accordance with a more particular embodiment. The battery management apparatus 200 includes a charger 210 that drives a desired current into a battery, and a cell supervisor 220 that monitors the cell voltage(s). In some implementations, a plurality of cell supervisors, such as cell supervisor 220, are implemented for each cell within a battery that is charged by charger 210. The charger 210 includes a DCDC converter 211 that provides an output, using voltage supply 219, to an ammeter 212 that in turn provides an output to a comparator 213. A low-pass filter 214 also provides an output to a comparator 215, which is also supplied with a present maximum voltage input. The comparator 215 provides an output to a minimum detector 216, which is fed a signal $I_{charge}$ that sets a current according to a particular profile. A sine generator 217 generates a reference signal that his added at adder 218 to an output of the minimum detector 216, and provided as another input to the comparator 213, as a reference to control the duty cycle of the DCDC converter 211. The reference includes a DC component corresponding to signal $I_{charge}$ and an AC component generated by the sine generator 217 (e.g., the frequency of which can be varied). The low-pass filter 214 ensures that the generated sine is not suppressed when the charger is in a constant-voltage mode. Once the battery voltage reaches a set maximum level, it is kept constant via the control loop that includes signal $V_{max}$ as its input, which is active via the control of the minimum detector 216.

The cell supervisor 220 includes a low-pass filter 221 that is coupled to receive a signal across an individual cell 230, and provides an output to an analog-to-digital converter (ADC) 222. The ADC 222 provides an output to another low-pass filter 223, which provides an output indicative of the battery voltage. A sine (or cosine) generator 224 provides a reference signal to a synchronous demodulator 225, which also receives the output of the ADC 222 and which generates outputs indicative of real and imaginary parts of an impedance of the cell 230. These aspects may be used, for example, by the charger 210 to set a frequency and/or level of modulated charging current provided via the DCDC converter 211. In some implementations, the modulation of the charge current is controlled such that small modulations of the cell voltages are low enough (e.g., 1 mV or less) so as to mitigate reduction in cell lifetime.

Temperature can be estimated via detection of impedance aspects of the cell, based upon an output of cell supervisor 220, such as described in U.S. patent application Ser. No. 13/555,923, which is fully incorporated herein by reference. For instance, the temperature can be ascertained for each individual cell in the system by varying the frequency of the sine and looking for a frequency at which the imaginary part of the cell impedance is zero, at which the voltage across and the current through the cell are in phase, or at an intercept point.

In some embodiments, such as for systems with a low number of cells as applicable to a mobile phone with one battery cell, a tablet with two cells, or a laptop with three cells, the charger 210 and cell supervisor 220 can be easily integrated into one integrated circuit (IC). In certain implementations, the sine generator of the charger 210 and the (co)sine generator of the cell supervisor 220 are the same component. In other embodiments such as in automotive applications with a large number of cells, functions relating to the charger and supervisor aspects can be distributed in several ICs (e.g., with the sine generator of the charger synchronized with the (co)sine generator of the supervisor, such as described in U.S. patent application Ser. No. 14/107, 530 which is fully incorporated herein by reference.

Figure 3:
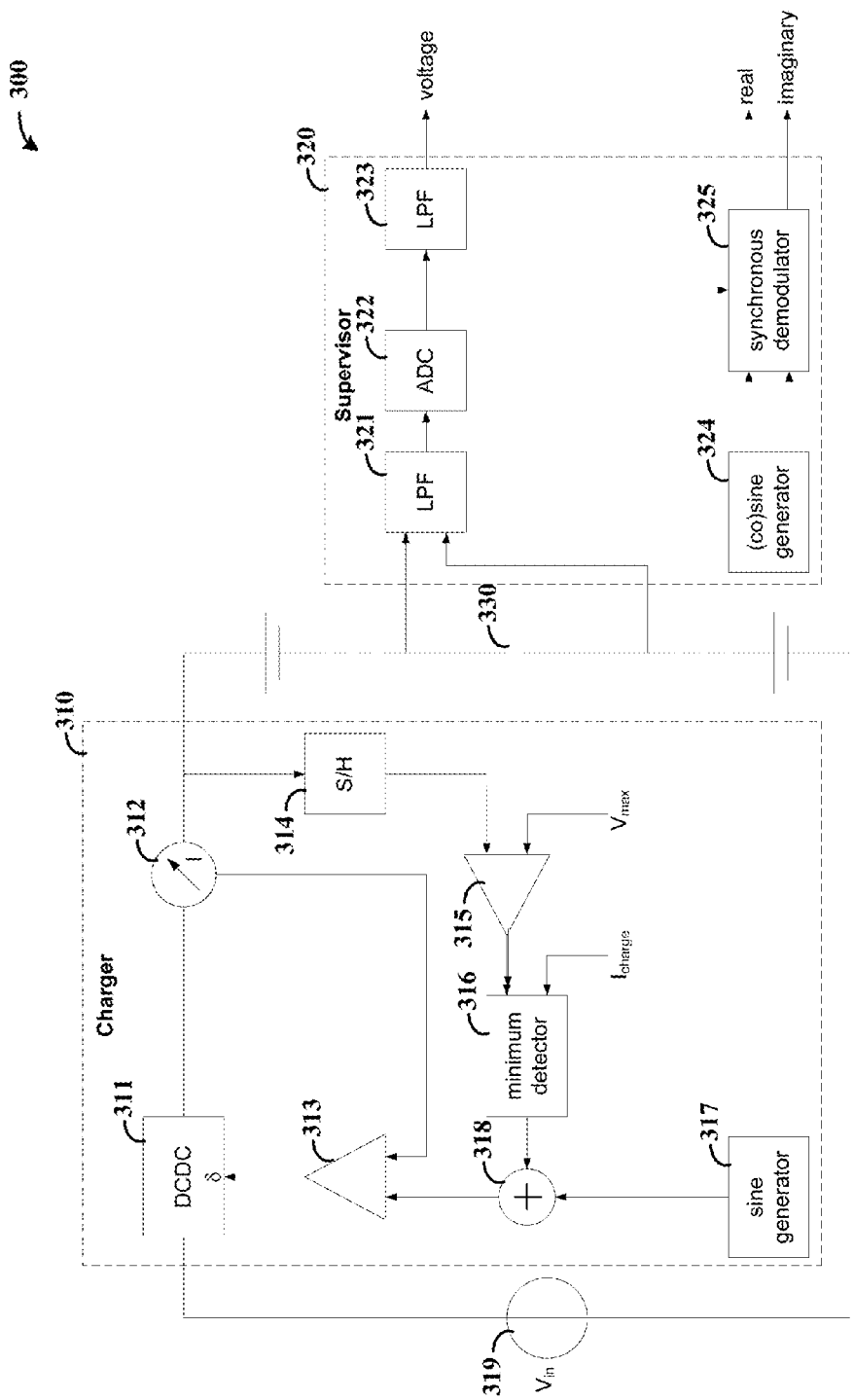
FIG. 3 shows another battery management apparatus, in accordance with another embodiment.

Referring now to FIG. 3, another battery management apparatus 300 is shown, in accordance with another embodiment. The battery management apparatus 300 is similar to apparatus 200 as shown in FIG. 2, with a sample-and-hold (S/H) circuit 314 used in place of the low-pass filter 214 of the constant-voltage loop of the charger 210. Other aspects of the battery management apparatus 300 are labeled with reference numbers that are similar to those in FIG. 2 (e.g., DCDC converters 211 and 311), and may thus be characterized as described with FIG. 2. The S/H circuit 314 takes samples synchronously with the sine wave generated by sine generator 317, and the sine wave can be effectively eliminated at its output.

Various approaches to estimating temperature via impedance, with related frequencies of charging current, are implemented to suit one or more embodiments. For example, low- and mid-frequency components of impedance can be used to estimate temperatures. An intercept frequency at which cell impedance is real and the phase shift between alternating voltage and current is zero for different temperatures can be used as an indication of temperature. Such an approach may be implemented, for example, as consistent with those approaches described in L. H. J. Raijmakers, D. L. Danilov, J. P. M. van Lammeren, M. J. G. Lammers, P. H. L. Notten, "Sensorless battery temperature measurements based on electrochemical impedance spectroscopy," Journal of Power Sources (2013), which is fully incorporated herein by reference.

Various embodiments are directed to detecting temperature based upon a non-zero intercept frequency of such a plot for impedance. In this case the frequency at which the measurement is made is taken at a particular positive imaginary impedance value (e.g., in the inductive area of the battery's impedance). Observing a non-zero intercept frequency at frequencies higher than a zero intercept frequency can be used to avoid lower frequencies, which allows effects of charge transfer processes to be neglected, and to mitigate interference, as the amplitude of such interference can be smaller at higher frequencies. Such a non-zero intercept frequency increases with a higher positive imaginary value of the impedance, which can be used for accurate temperature gauging.

Another approach to estimating battery temperature involves measuring phase shift between alternating current and voltage at a particular frequency, chosen such that the imaginary part of the impedance is positive (e.g., in the inductive area of the battery's impedance). In such an approach the phase shift is also positive, as may be facilitated by measuring in the inductive area of the impedance such that the frequencies are beyond a frequency range in which the main electrochemical storage reactions take place.

In some embodiments, an intercept frequency is measured as follows. A sequence of measurements is taken by first measuring the cell impedance at an arbitrary frequency. If the imaginary part of the impedance is higher than the target value (e.g., zero or non-zero), then a higher frequency is tried next. If the imaginary part of the impedance is lower than such a target value, a lower frequency is tried next. This procedure can be repeated to obtain two (or more) measurements, which can be used via interpolation to estimate temperature. In some implementations, to keep the measurement time as short as possible, two measurement frequencies are injected into the cell simultaneously. Two simultaneously injected frequencies can be handled by a hardware solution, such as by using the sine (or cosine) generator 224 and synchronous demodulator 225 of FIG. 2 with a multiplexer, or duplicating these circuits for measuring at two different frequencies. Such an approach can be carried out by choosing two frequencies such that the intercept point found in a previous measurement is halfway between the frequencies, such as where temperature is measured at a rate higher than the inverse of the cell's thermal time constant. In some embodiments, temperature estimation for ageing battery cells is calibrated with an external temperature sensor, located somewhere in the battery pack, when the battery pack is in thermal equilibrium.

FIGS. 4 and 5 show plot of non-zero intercept frequencies $f_{(0.5)}$ and $f_{(1.0)}$, as may be used in estimating temperature in accordance with one or more embodiments. Temperature is shown on the horizontal axis, with corresponding non-zero intercept frequencies on the vertical axis, for various exemplary implementations. Different frequencies can be matched to respective temperatures using such plots, using frequencies at which the imaginary part of impedance is positive, and thereby estimate temperature based on related impedance.

FIGS. 6-9 show plots of phase shift at respective frequencies of about 1510 Hz, 1914 Hz, 3888 Hz and 4923 Hz, as used in estimating temperature in accordance with one or more embodiments. Temperature is shown on the horizontal axis, and phase shift between alternating current and voltage is shown on the vertical axis, for respective implementations. The exhibited correlation between phase shift and temperature can be used to estimate temperature for respective impedance, with frequencies at which the imaginary part of the impedance is positive.

The various embodiments described herein and/or shown in the figures may be combined or implemented separately, for various applications. Various embodiments may be implemented with one or more aspects and approaches to achieve various results. In some embodiments, temperature estimation is carried out without using temperature sensors and associated wiring. In other embodiments, measurement lag due to the thermal mass of the battery cell is reduced or eliminated, such as for fast charging applications in which the temperature of the battery may rise very quickly if something goes wrong inside the cell. In yet other embodiments, the phase difference between current and voltage in the cell is measured and can be used alone to provide an estimation of temperature (e.g., without necessarily knowing or detecting signal amplitude). Moreover, one or more embodiments may be implemented in connection with various aspects such as those described in one or both of: Young-Jin Hong and Chi-Su Kim, "Modeling of the thermal behaviour of a Lithium-Ion battery pack," Advanced Automotive Battery conference 2010; and P. H. L. Notten, J. H. G. op het Veld, J. R. G. van Beek, "Boostcharging Li-ion batteries: A challenging new charging concept," Journal of Power Sources (2005), which are fully incorporated herein by reference.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., controlling the modulation of frequency of a charging current, estimating impedance, or controlling an amount of charging current). For example, in certain of the above-discussed embodiments, one or more modules are discrete logic circuits or programmable logic circuits configured and arranged for implementing these operations/activities, as in the circuit modules shown in FIG. 1. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, different modulation and related adjustment approaches can be carried out to effect impedance measurement that is sufficient for estimating temperature to a workable degree. Such modifications do not depart from the true spirit and scope of various aspects of the invention, including aspects set forth in the claims.

What is claimed is:

1. An apparatus comprising:
   a first circuit configured and arranged to modulate charging current for charging a battery, and to set the frequency of the modulated charging current to a frequency indicative of an intercept point of an impedance curve of the battery; and
   a second circuit configured and arranged to estimate temperature of the battery based upon the impedance exhibited by the battery while the battery is charged with the modulated charging current by estimating temperature using linear interpolation with the set frequency indicative of the intercept point.

2. The apparatus of claim 1, wherein the second circuit is configured and arranged to regulate the charging current by reducing the charging current in response to the temperature exceeding a predefined threshold.

3. The apparatus of claim 1, wherein the first circuit is configured and arranged to modify a frequency at which the charging current is modulated based on the impedance.

4. The apparatus of claim 1, further including a third circuit configured and arranged to detect the impedance of the battery, and being configured and arranged with the first circuit to modify the frequency of the modulated charging current based on a phase difference of voltage and current through the battery.

5. The apparatus of claim 1, wherein the first circuit is configured and arranged to modulate the charging current by setting a frequency of the charging current to a frequency indicative of a zero crossing point of an imaginary part of an impedance curve for the battery.

6. The apparatus of claim 1, wherein the first circuit is configured and arranged to modulate the charging current by setting a frequency of the charging current to a frequency at which an imaginary part of the impedance is positive and at which the frequency is indicative of a non-zero intercept frequency of the imaginary part of the impedance.

7. The apparatus of claim 6, wherein the second circuit is configured and arranged to estimate the temperature of the battery based upon the non-zero intercept frequency and a correlation between non-zero intercept frequency and temperature.

8. The apparatus of claim 1, wherein
the first circuit is configured and arranged to modulate the charging current at a frequency at which an imaginary part of the impedance is positive, and
the second circuit is configured and arranged to estimate temperature of the battery based upon a phase between current and voltage exhibited by the battery while the battery is charged with the modulated charging current.

9. An apparatus comprising:
a current modulation circuit configured and arranged to modulate charging current provided by a charging source by setting a frequency of the charging current to a frequency at which an imaginary part of the impedance is positive and at which the frequency is indicative of a non-zero intercept frequency of the imaginary part of an impedance curve for the battery, and to provide the modulated charging current as an output for charging a battery;
an impedance detection circuit configured and arranged with the current modulation circuit to detect an impedance of the battery based on the frequency of the modulated current, and to modify the frequency of the modulated charging current based on the detected impedance;
a temperature estimation circuit configured and arranged to estimate temperature of the battery based upon the detected impedance and upon the non-zero intercept frequency and a correlation between non-zero intercept frequency and temperature; and
a current regulator circuit configured and arranged to regulate the modulated charging current provided as the output based upon the estimated temperature.

10. The apparatus of claim 9, wherein the impedance detection circuit is configured and arranged with the current modulation circuit to modify the frequency of the modulated charging current based on a phase difference of voltage and current through the battery.

11. The apparatus of claim 9, wherein the current modulation circuit is configured and arranged to modulate the charging current by setting a frequency of the charging current to a frequency indicative of a zero crossing point of an imaginary part of an impedance curve for the battery.

12. The apparatus of claim 9, wherein
the current modulation circuit is configured and arranged to modulate the charging current by setting a frequency at which an imaginary part of the impedance is positive, and
the temperature estimation circuit is configured and arranged to estimate temperature of the battery based upon a phase between current and voltage exhibited by the battery while the battery is charged with the modulated charging current.

13. An apparatus comprising:
a current modulation circuit configured and arranged to modulate charging current provided by a charging source, the current modulation circuit is configured arranged to modulate the charging current by setting a frequency of the charging current to a frequency indicative of an intercept point of an impedance curve for the battery, based upon the impedance detected by the impedance detection circuit, and to provide the modulated charging current as an output for charging a battery;
an impedance detection circuit configured and arranged with the current modulation circuit to detect an impedance of the battery based on the frequency of the modulated current, and to modify the frequency of the modulated charging current based on the detected impedance;
the temperature estimation circuit is configured and arranged to estimate temperature of the battery based upon the impedance exhibited by the battery while the battery is charged with the modulated charging current, by estimating temperature using linear interpolation with the frequency indicative of the intercept point; and
a current regulator circuit configured and arranged to regulate the modulated charging current provided as the output based upon the estimated temperature.

14. A method comprising:
modulating charging current for charging a battery;
setting the frequency of the modulated charging current to a frequency indicative of an intercept point of an impedance curve of the battery; and
estimating temperature of the battery based upon the impedance exhibited by the battery while the battery is charged with the modulated charging current using linear interpolation with the frequency indicative of the intercept point.

15. The method of claim 14, further including regulating the charging current by reducing the charging current in response to the estimated temperature exceeding a predefined threshold.

16. The method of claim 14, wherein modulating the charging current includes at least one of:
setting a frequency of the charging current to a frequency indicative of a zero crossing point of an imaginary part of an impedance curve for the battery;
setting a frequency of the charging current to a frequency at which an imaginary part of the impedance is positive and at which the frequency is indicative of a non-zero intercept frequency of the imaginary part of the impedance curve; and
setting a frequency of the charging current based on a phase difference of voltage and current through the battery.

* * * * *